(12) United States Patent
Yoneda et al.

(10) Patent No.: US 10,032,394 B2
(45) Date of Patent: Jul. 24, 2018

(54) DISPLAY DEVICE

(71) Applicant: Mitsubishi Electric Corporation, Tokyo (JP)

(72) Inventors: Masaru Yoneda, Tokyo (JP); Yutaka Mizutani, Tokyo (JP); Atsutomo Hayamizu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/035,329

(22) PCT Filed: Nov. 28, 2013

(86) PCT No.: PCT/JP2013/082083
§ 371 (c)(1),
(2) Date: May 9, 2016

(87) PCT Pub. No.: WO2015/079539
PCT Pub. Date: Jun. 4, 2015

(65) Prior Publication Data
US 2016/0293070 A1    Oct. 6, 2016

(51) Int. Cl.
*G09F 13/08* (2006.01)
*G05B 19/05* (2006.01)
(Continued)

(52) U.S. Cl.
CPC .............. *G09F 13/08* (2013.01); *G05B 19/05* (2013.01); *G09F 13/22* (2013.01); *G09F 23/00* (2013.01); *G09F 2013/222* (2013.01)

(58) Field of Classification Search
CPC ..................... G09F 13/08; G09F 2013/222
See application file for complete search history.

(56) References Cited

U.S. PATENT DOCUMENTS 4,593,242 A    6/1986    Bristol et al.
5,809,676 A    9/1998    Sukumoda et al.
(Continued)

FOREIGN PATENT DOCUMENTS

CN    102044196 A    5/2011
JP    52-56590 U    4/1977
(Continued)

OTHER PUBLICATIONS

International Search Report for PCT/JP2013/082083 dated Feb. 4, 2014 [PCT/ISA/210].
(Continued)

*Primary Examiner* — Gary C Hoge
(74) *Attorney, Agent, or Firm* — Sughrue Mion, PLLC; Richard C. Turner (57) ABSTRACT

Provided is a display device that includes an LED board on which a plurality of LED chips arranged in a matrix shape are mounted and an LED cover that covers a surface of the LED board where the LED chips is mounted and that is applied, as an LED display unit displaying a state of operation, for an electronic device, wherein the LED cover includes a front surface portion with a back surface arranged to face the LED chips, the back surface having grid-shaped ribs projected to form a plurality of recessed light guide holes at locations corresponding to the LED chips and characters printed on a front surface of the front surface portion adjacent to locations corresponding to bottom surfaces of the light guide holes, wherein each of the light guide holes is a tapered hole of which opening area is decreased toward the bottom surface, and the bottom surfaces are satin finished.

18 Claims, 11 Drawing Sheets

(51) Int. Cl.
*G09F 23/00* (2006.01)
*G09F 13/22* (2006.01)

(56) References Cited

U.S. PATENT DOCUMENTS

| | | | |
|---|---|---|---|
| 6,020,824 A | 2/2000 | Tamura et al. | |
| 7,649,743 B2* | 1/2010 | Ni | G06F 12/1416 361/727 |
| 8,591,050 B2* | 11/2013 | Yim | G09F 13/08 362/23.19 |
| 8,830,082 B2* | 9/2014 | Ku | B60Q 1/2696 340/467 |
| 8,974,077 B2* | 3/2015 | Auyeung | F21S 6/006 362/218 |
| 9,134,475 B2* | 9/2015 | Watanabe | G02B 6/0043 |
| 2010/0218565 A1 | 9/2010 | Wan et al. | |
| 2011/0096045 A1 | 4/2011 | Ito et al. | |
| 2013/0044059 A1 | 2/2013 | Fu | |

FOREIGN PATENT DOCUMENTS

| | | |
|---|---|---|
| JP | 55-53417 U | 4/1980 |
| JP | 59-92357 A | 5/1984 |
| JP | 60-191080 U | 12/1985 |
| JP | 05-010582 U | 2/1993 |
| JP | 07-092917 A | 4/1995 |
| JP | 09-016107 A | 1/1997 |
| JP | 09-173558 A | 7/1997 |
| JP | 11-259005 A | 9/1999 |
| JP | 11-260438 A | 9/1999 |
| JP | 2001-109542 A | 4/2001 |
| JP | 2002-372935 A | 12/2002 |
| JP | 2009-187279 A | 8/2009 |
| JP | 2011-175048 A | 9/2011 |
| JP | 2011-175049 A | 9/2011 |
| TW | 201310279 A | 3/2013 |

OTHER PUBLICATIONS

Written Opinion for PCT/JP2013/082083 dated Feb. 4, 2014 [PCT/ISA/237].
Taiwanese Examination Report issued by the Intellectual Property Office corresponding Taiwanese Application No. 103116209 dated May 26, 2015.
Japanese Decision of a Patent Grant issued in JP Application No. 2015-550272, dated Dec. 16, 2016.
Japanese Notice of Rejection issued in JP Application No. 2015-550272 dated Jul. 19, 2016.
Communication dated Jul. 31, 2017 from the German Patent and Trademark Office in counterpart application No. 11 2013 007 654.3.

* cited by examiner

DISPLAY DEVICE

CROSS REFERENCE TO RELATED APPLICATIONS

This application is a National Stage of International Application No. PCT/JP2013/082083 filed Nov. 28, 2013, the contents of all of which are incorporated herein by reference in their entirety.

FIELD

The present invention relates to a display device applied, as a display unit displaying a state of operation or the like, for an electronic device.

BACKGROUND

In general, a programmable logic controller (PLC) includes a display device using a light emitting element as a display unit for displaying a state of operation or the like of a device. The light emitting element used for the display device is generally a light emitting diode (LED). Namely, in general, the PLC includes an LED display unit. The LED display unit includes a plurality of LED chips which are mounted on a printed board (generally, referred to as an LED board) and arranged in a matrix shape and is covered with an LED cover formed with a semi-transparent resin material. Characters are printed on a front surface of the LED cover so as to correspond to the LED chips arranged in a matrix shape on the LED board, and portions adjacent to the characters are enabled to emit light by allowing light (LED light) emitted from the LED chips to transmit from a back surface to the front surface of the LED cover, so that the state of operation or the like can be displayed in the LED display unit.

In recent years, miniaturization and weight reduction of a programmable logic controller are required, and the area of an LED display unit is also reduced. Particularly, reduction in width-direction dimensions of the programmable logic controller is greatly required. Therefore, the mounting interval of LED chips on an LED board is also reduced.

If the mounting interval of the LED chips is reduced, there is a problem in that visibility is easily deteriorated, for example, overlap of characters printed on the LED cover and the LED light occurs, or misrecognition in adjacent LEDs occurs when the LED display is viewed from a slanted side.

As an invention relating to improvement of visibility of the LED light in the LED display unit, there are inventions disclosed in Patent Literatures 1 and 2.

In the invention disclosed in Patent Literature 1, a cylindrical member is installed between an LED and a display panel so that the position of light is not shifted when the display panel is viewed from any position in front of the display panel.

In the invention disclosed in Patent Literature 2, a grid-shaped LED filter is disposed at a surface side of an LED board to partition a light emitting area for each LED, so that visibility is intended to be improved.

CITATION LIST

Patent Literature

Patent Literature 1: Japanese Patent Application Laid-Open No. H11-259005

Patent Literature 2: Japanese Patent Application Laid-Open No. 2009-187279

SUMMARY

Technical Problem

However, in the invention disclosed in Patent Literature 1, since a member of partitioning the light and a member of transmitting the light are configured separately, position alignment between the cylindrical member and the display panel is needed. Therefore, in the invention disclosed in Patent Literature 1, production cost or assembly cost of the LED display unit is increased. In the invention disclosed in Patent Literature 2, the light emitted from the LEDs is absorbed and scattered when passing through the filter, and thus, the light amount passing through the filter unit is decreased, so that there is a problem in that the LED light displayed in the display unit becomes dark.

The above problem does not occur only in the display device using LEDs. There is a possibility that the problem also occurs in a display device using other light emitting elements (for example, laser diodes (LDs)).

The present invention has been achieved in view of the above circumstances and an object of the present invention is to provide a display device that prevents a shift of light emitted from a light emitting element as viewed from a slanted side and where the light emitted from a light emitting element has high transmittance and an assembly work for a cover is not required.

Solution to Problem

To solve the above problem and achieve the object a display device according to the present invention includes: a light emitting element board on which a plurality of light emitting elements arranged in a matrix shape are mounted; and a cover that covers a surface of the light emitting element board where the light emitting elements is mounted. The display device is applied, as a display unit displaying a state of operation, for an electronic device. The cover includes: a light transmitting plate where a back surface thereof is arranged to face the light emitting elements and a grid-shaped light transmission preventing wall projected to form a plurality of recessed light guide holes at locations corresponding to the light emitting elements are formed on the back surface thereof; a print layer where characters are printed adjacent to each of locations corresponding to bottom surfaces of the light guide holes on a front surface of the light transmitting plate. Each of the light guide holes is a tapered hole of which opening area is decreased toward the bottom surfaces, and the bottom surfaces are satin finished.

Advantageous Effects of Invention

A display device according to the present invention achieves effects in that an assembly work for a cover is not required, and a shift of light emitted from a light emitting element as viewed from a slanted side is prevented, and the light emitted from the light emitting element can be brightly displayed.

DESCRIPTION OF EMBODIMENTS

Hereinafter, embodiments of a display device according to the present invention will be described in detail with reference to the drawings. However, the present invention is not limited to the embodiments.

Embodiment

Figure 1:
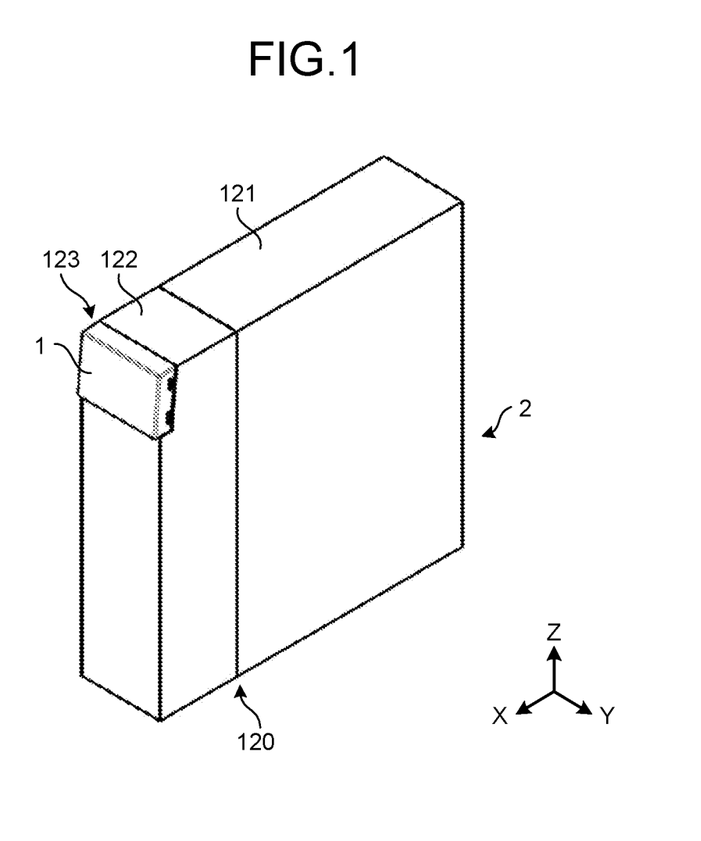
FIG. 1 is a perspective view illustrating a programmable logic controller employing an embodiment of a display device according to the present invention.
Figure 2A:
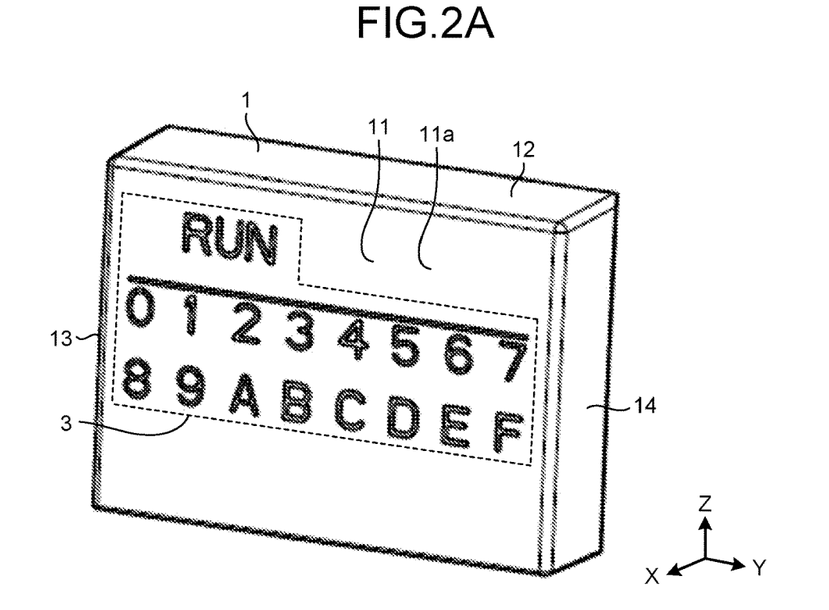
FIG. 2A is a perspective view illustrating an LED cover according to the embodiment.
Figure 2B:
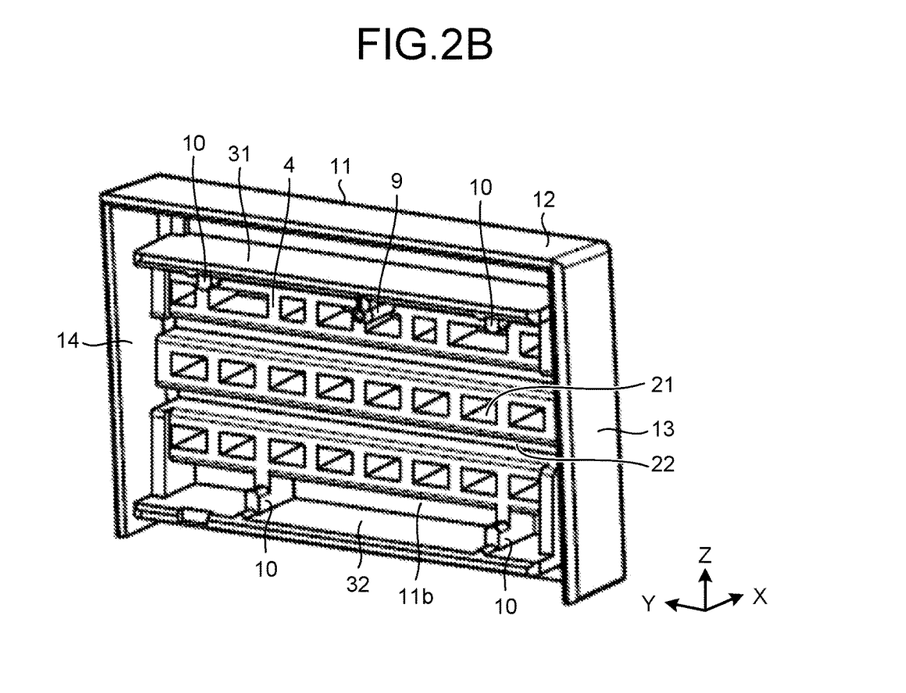
FIG. 2B is a perspective view illustrating the LED cover according to the embodiment.
Figure 3:
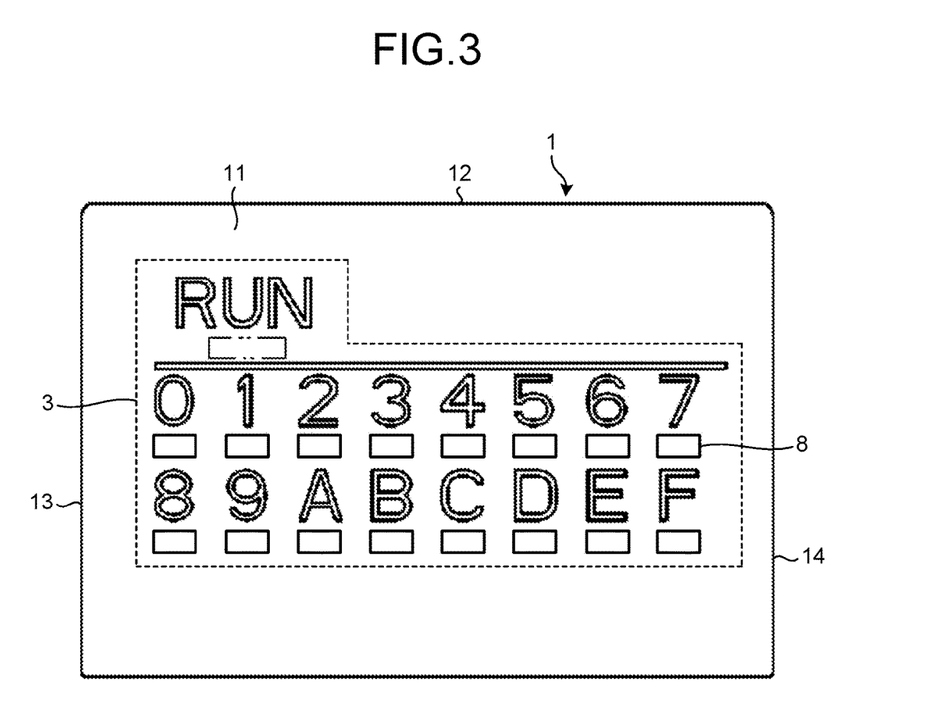
FIG. 3 is a front view illustrating the LED cover according to the embodiment.
Figure 4:
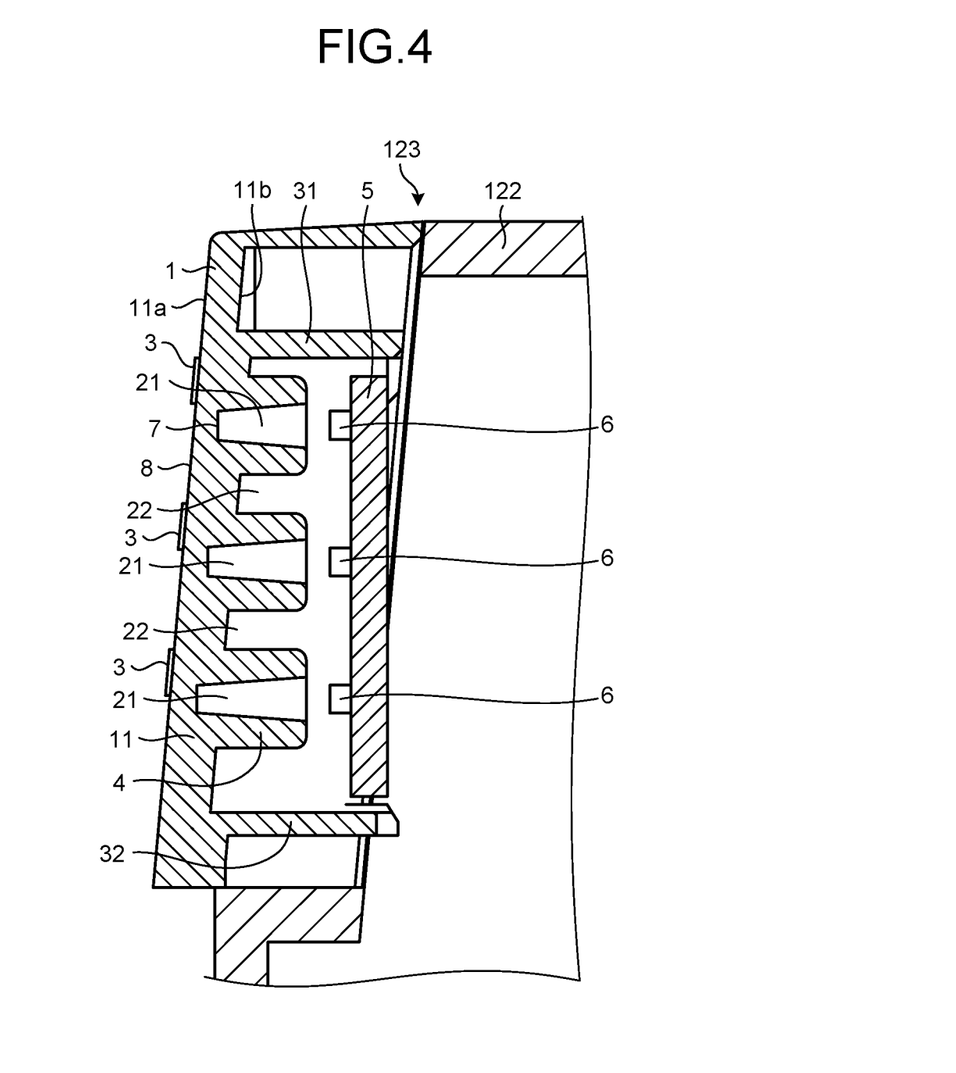
FIG. 4 is a cross-sectional view illustrating the programmable logic controller including an LED display unit as a display device according to the embodiment.

FIG. 1 is a perspective view illustrating a programmable logic controller employing an embodiment of a display device according to the present invention. FIG. 2A and FIG. 2B are perspective views illustrating an LED cover according to the embodiment. FIG. 2A illustrates a front side structure of the LED cover 1, and FIG. 2B illustrates a back side structure of the LED cover 1. FIG. 3 is a front view illustrating the LED cover according to the embodiment. FIG. 4 is a cross-sectional view illustrating the programmable logic controller including an LED display unit as a display device according to the embodiment. For simplifying the description, in FIG. 1, FIG. 2A, and FIG. 2B, +X, −X, +Y, −Y, +Z, and −Z directions are defined as front, back, right, left, upper, and lower, respectively. However, the front, back, left, right, upper, and lower do not define the directions where the programmable logic controller 2 is installed.

A unit main body 120 of the programmable logic controller 2 is configured with a case 121 and a face plate 122. The case 121 has a shape of a hexahedral box with the front surface being opened and accommodates a circuit board where hardware required for realizing functions as a programmable logic controller is mounted. The face plate 122 is installed in front of the case 121 to block the opened surface of the case 121 and to cover the hardware accommodated in the case 121. An LED board 5 as a light emitting element board described below is installed in a front upper portion of the face plate 122, and the LED cover 1 is attached to the LED board 5, so that the LED display unit 123 is configured. The LED display unit 123 displays a state of operation of the programmable logic controller 2.

The LED cover 1 is a cover covering the surface on which the plurality of light emitting elements (LED chips 6) of the LED board 5 are mounted, and the LED cover is attached so as to cover the LED board 5. The LED cover 1 is molded by using a semi-transparent resin material as a raw material and transmits LED light emitted from the LED chips 6 mounted on the LED board 5. The LED chips 6 are LEDs having a chip-shaped package and are mounted on the front surface of the LED board 5. In general, the LED chip 6 has an outer shape of a rectangle, and a light flux of the LED light has substantially the same outer shape as that of the LED chip 6.

The LED cover 1 has a shape similar to a flat hexahedral box as a whole, and two surfaces thereof are opened surfaces. One of the opened surfaces is a back surface, and the other of the opened surfaces is a lower surface. Namely, the LED cover 1 has a structure including a front surface portion 11, an upper surface portion 12, a left side surface portion 13, and a right side surface portion 14 and including no portions corresponding to a back surface portion and a lower surface portion. A back surface of the LED cover 1 is one of a pair of main surfaces (a pair of large-area surfaces), and a lower surface is a surface interposed between the main surfaces.

The front surface portion 11 of the LED cover 1 is disposed to face the LED chips 6 and functions as a light transmitting plate which transmits the LED light emitted from the LED chip 6. In a front surface 11a of the front surface portion 11, a print layer where characters 3 are printed is provided adjacent to light guide portions 8 described below. Namely, the characters 3 are formed as print layers on the front surface 11a of the front surface portion 11. In the embodiment, on the front surface 11a of the front surface portion 11, 17 types of the characters 3 of "RUN", "0 to 8", and "A to F" are printed.

In the front surface portion 11, ribs 4 are formed to be projected on the back surface 11b thereof. Namely, the ribs 4 are molded integrally with the front surface portion 11. The ribs 4 are formed in a grid shape, and portions surrounded by the ribs 4 constitute a plurality of light guide holes 21. The light guide holes 21 are recessed holes (so-called blind holes) having bottom surfaces 7 and correspond to the LED chips 6 mounted on the LED board 5 described below. The bottom surface 7 of the light guide hole 21 has a rectangular shape, and is satin finished. The bottom surfaces 7 of the light guide holes 21 reach the back surface 11b of the front surface portion 11. In the portions where the bottom surfaces 7 of the light guide holes 21 are located, the light guide portions 8 are formed on the front surface 11a of the front surface portion 11 of the LED cover 1. In the embodiment, since the bottom surface 7 of the light guide hole 21 has a rectangular shape, the light guide portion 8 also has a rectangular shape. For convenience of the description, in FIG. 3, the light guide portions 8 are illustrated in solid lines. However, actually, the front surface 11a of the front surface portion 11 is flat, and in the state where the LED light does not transmit, the light guide portions 8 cannot be distinguished from other portions by naked eyes.

The number of light guide holes 21 may be larger than the number of LED chips 6 mounted on the LED board 5. For example, the ribs 4 illustrated in FIG. 2B form 8 columns×3 stages of 24 light guide holes 21. However, the LED chips 6 corresponding to all the 24 light guide holes 21 may not be necessarily mounted on the LED board 5. In the embodiment, the LED chips 6 are mounted on the LED board 5 so as to correspond to only the light guide holes 21 adjacent to the character 3 of "RUN" among the uppermost stage of 8 light guide holes 21, and the light guide holes 21 other than the light guide holes 21 adjacent to the character 3 of "RUN" are not used. The light guide holes 21 where the LED chips 6 are not mounted are prepared at the corresponding positions on the LED board 5 in order to be commonly used for LED covers and parts where print contents of characters 3 are different, so that cost of parts can be reduced.

As illustrated in FIG. 4, the rib 4 is configured so that a base side thereof is wide and a distal end thereof is narrow. Namely, the rib 4 becomes wider as it is closer to the front surface portion 11 of the LED cover 1. Therefore, the light guide hole 21 becomes a tapered hole of which opening area becomes smaller as it is closer to the front surface portion 11 of the LED cover 1. Since the light guide holes 21 are formed as tapered holes, a mold release property at the time of manufacturing the LED cover 1 is improved, and light incident in the light guide holes 21 is reflected on side surfaces of light guide holes 21 to be condensed on the bottom surfaces 7.

Portions constituting sidewalls of the light guide holes 21 of the ribs 4 are formed with a resin having reflectance higher than that of a resin material constituting other portions, and thus, the light which is not absorbed by the sidewalls of the light guide holes 21 but reflected is increased, so that a light amount reaching the bottom surfaces 7 of the light guide holes 21 can be increased. For example, the portions constituting the sidewalls of the light guide holes 21 of the ribs 4 is formed with a white resin material, and thus, the light which is not absorbed by the side surfaces of the light guide holes 21 but reflected is increased, so that the light amount reaching the bottom surfaces 7 of the light guide holes 21 can be increased. Therefore, even if the bottom surfaces 7 of the light guide holes 21 are disposed at positions shifted from optical axes of the LED chips 6, the light is reflected on the side surfaces of the light guide holes 21 to be guided to the bottom surfaces 7. The LED cover 1 may be formed by two-color molding in order to allow the reflectance of the portions constituting the sidewalls of the light guide holes 21 and the reflectance of the other portions to be different from each other (to be different color) in the ribs 4. For example, the LED cover 1 is formed by two-color molding, so that, in the ribs 4, the portions constituting the sidewalls of the light guide holes 21 can be configured with a white resin material and the other portions can be configured with a black semi-transparent resin material.

The ribs 4 have a thickness enough to prevent the light incident in the light guide holes 21 from transmitting to the outside, other than from the bottom surfaces 7, of the light guide holes 21. Namely, the ribs 4 function as light transmission preventing walls which prevent the LED light incident in the light guide holes 21 from transmitting out of the portions other than the bottom surfaces 7 of the light guide holes 21. For this reason, the LED light incident in the light guide holes 21 can transmit only the satin finished bottom surfaces 7 of the light guide holes 21.

The ribs 4 formed in a grid shape on the back surface 11b of the front surface portion 11 of the LED cover 1 are configured to form the light guide holes 21 corresponding to the LED chips 6, so that the transmission of the LED light incident in the light guide holes 21 to the outside, other than from the bottom surfaces 7, of the light guide holes 21 is prevented by the ribs 4. For this reason, the LED light emitted from the LED chip 6 do not reach the eyes of the user through the light guide holes 21 other than the corresponding light guide holes 21 or grooves 22 between the ribs 4.

Figure 5:
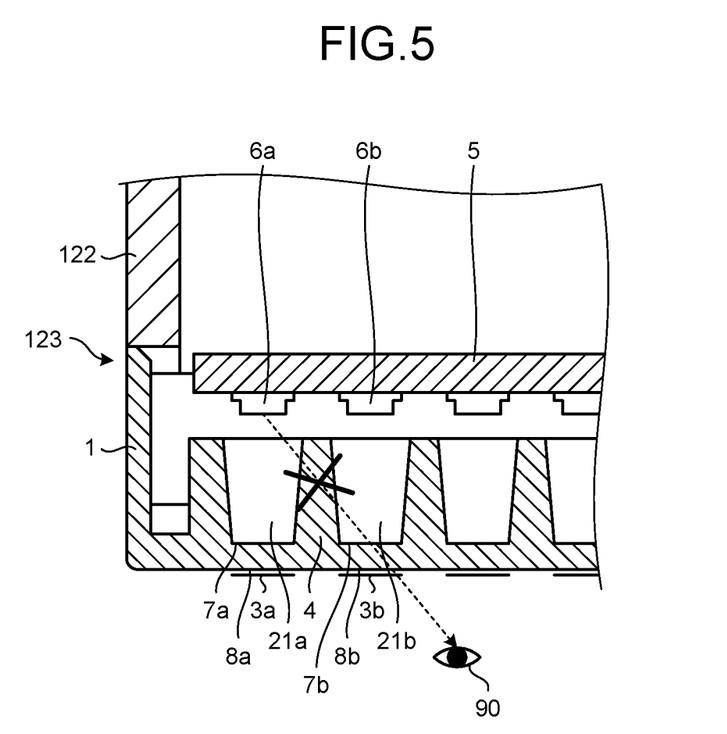
FIG. 5 is a diagram illustrating a state of the LED display unit where the LED cover according to the embodiment is installed as viewed from a slanted front side.
Figure 6:
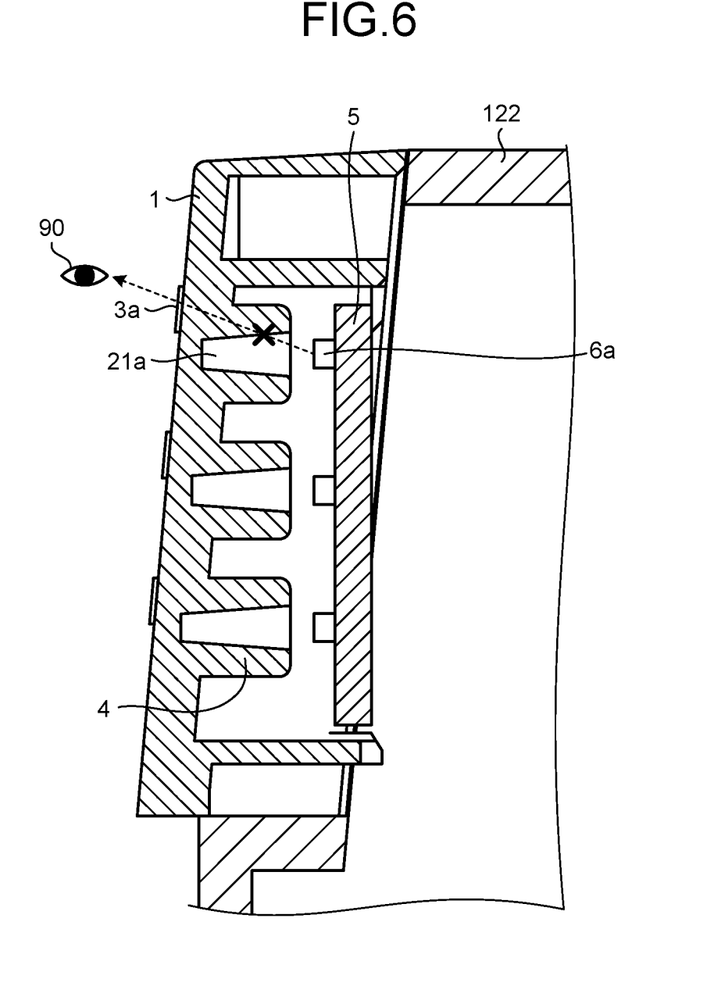
FIG. 6 is a diagram illustrating a state of the LED display unit where the LED cover according to the embodiment is installed as viewed from a slanted upper side.

The function of the ribs 4 as light transmission preventing walls will be described in a specific example with reference to FIG. 5 and FIG. 6. FIG. 5 is a diagram illustrating a state of the LED display unit where the LED cover according to the embodiment is mounted as viewed from a slanted front side. FIG. 6 is a diagram illustrating a state of the LED display unit where the LED cover according to the embodiment is mounted as viewed from a slanted upper side. In FIG. 5 and FIG. 6, symbols X on broken arrows denote that the LED light is blocked by the rib 4. As illustrated in FIG. 5, the transmission of the LED light incident in the light guide hole 21a to the outside of the light guide hole 21a is prevented by the rib 4 (the LED light transmits only the bottom surface 7a and is emitted from only the light guide portion 8a). Therefore, there is no fear that the LED light, emitted from the LED chip 6a corresponding to the character 3a transmitting the bottom surface 7b of the light guide hole 21b, is emitted from the light guide portion 8b to reach the eye 90 of the user. Thus, there is no fear that the LED light emitted from the LED chip 6a is visually misrecognized with the LED light emitted from the LED chip 6b corresponding to the character 3b adjacent to the character 3a. As illustrated in FIG. 6, the transmission of the LED light incident in the light guide hole 21a to the outside of the light guide hole 21a is prevented by the rib 4. Thus, there is no fear that the LED light emitted from the LED chip 6a transmits the portion of the character 3a to reach the eye 90 of the user, and thus, there is no fear that the LED light emitted from the LED chip 6a appears to be displayed to overlap with the character 3a.

The LED cover 1 according to the embodiment has a structure having no fear that the LED light emitted from the LED chip 6 corresponding to a character 3 is visually misrecognized with the LED light emitted from the LED chip 6 corresponding to an adjacent different character 3. The embodiment also has a structure having no fear that the LED light emitted from the LED chip 6 appears to be displayed to overlap with the character 3, thus, a mounting interval of the LED chips 6 can be reduced, and miniaturization of the programmable logic controller can be realized.

Figure 7A:
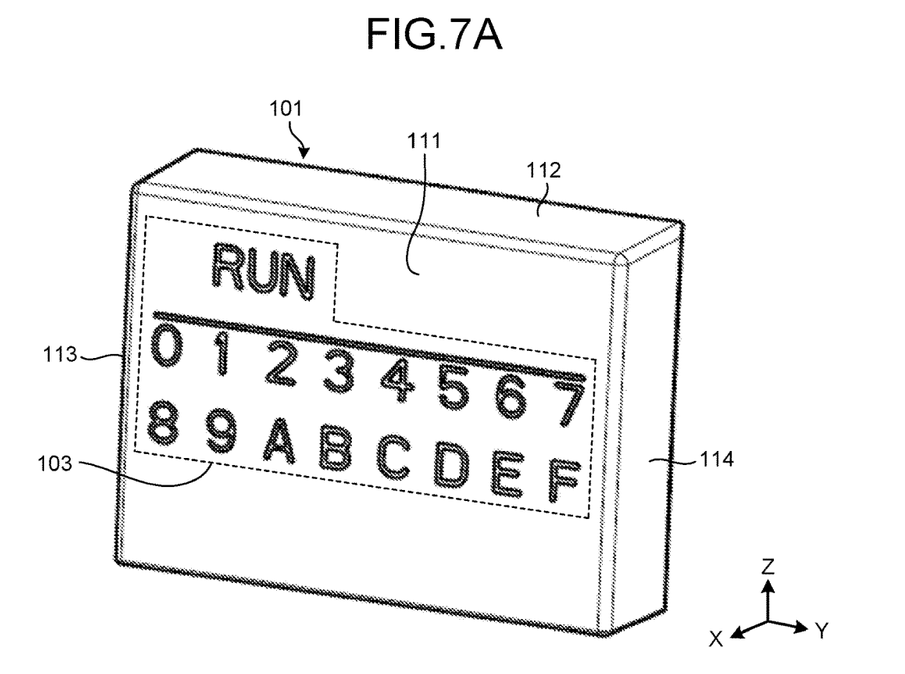
FIG. 7A is a diagram illustrating a structure of an LED cover having no rib.
Figure 7B:
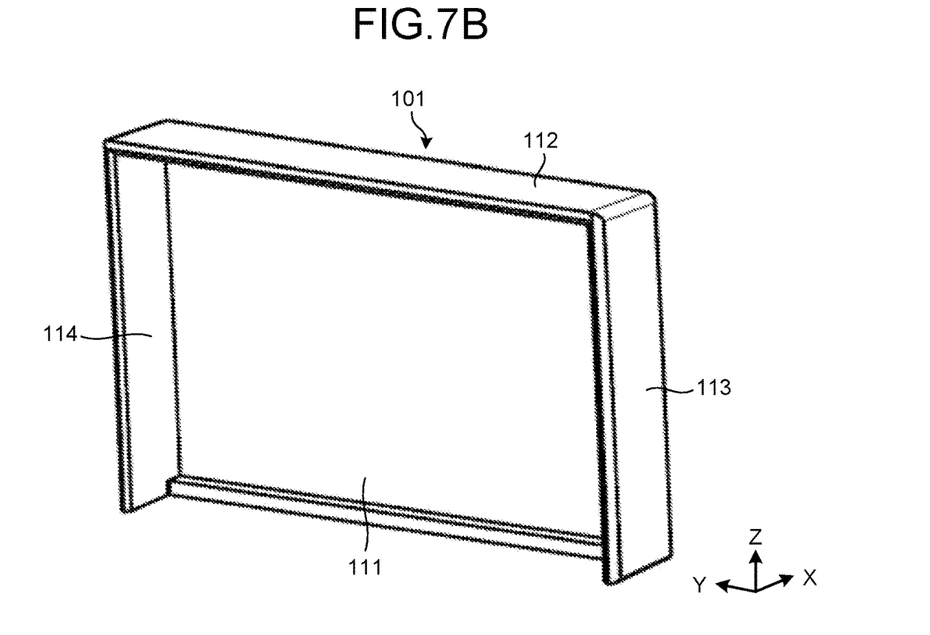
FIG. 7B is a diagram illustrating a structure of an LED cover having no rib.
Figure 8:
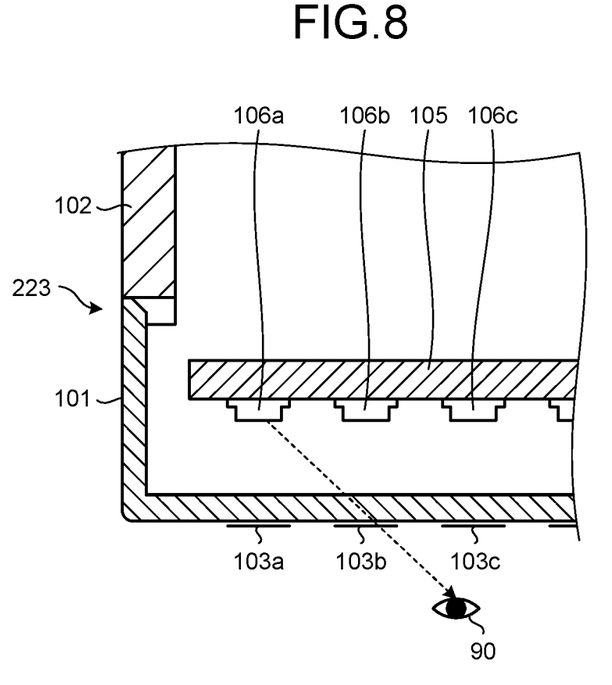
FIG. 8 is a diagram illustrating a state of the LED display unit where the LED cover having no rib is installed as viewed from a slanted front side.
Figure 9:
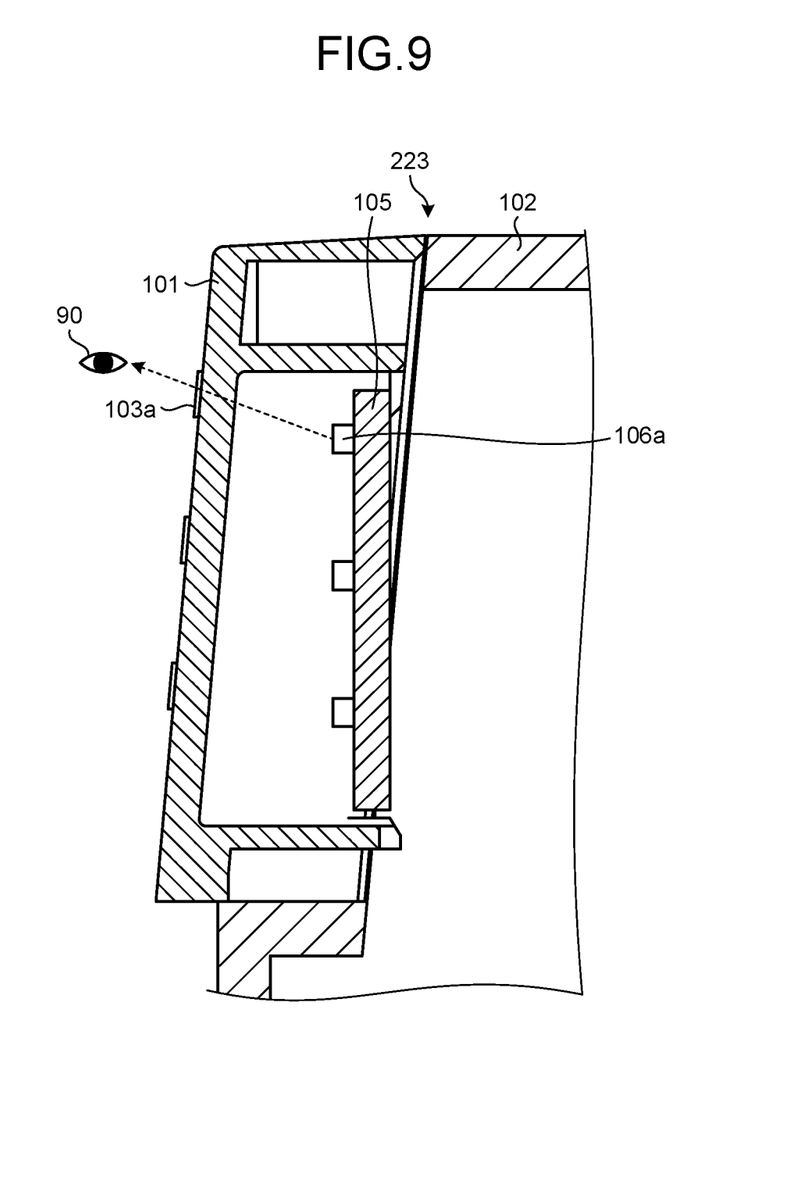
FIG. 9 is a diagram illustrating a state of the LED display unit where the LED cover having no rib is installed as viewed from a slanted upper side.

For the comparison, an LED cover having no rib will be described. FIG. 7A and FIG. 7B are diagrams illustrating a structure of the LED cover having no rib. FIG. 7A illustrates a front side structure of the LED cover, and FIG. 7B illustrates a back side structure of the LED cover. FIG. 8 is a diagram illustrating a state of the LED display unit where the LED cover having no rib is mounted as viewed from a slanted front side. FIG. 9 is a diagram illustrating a state of the LED display unit where the LED cover having no rib is mounted as viewed from a slanted upper side. Herein, in FIG. 7A and FIG. 7B, +X, −X, +Y, −Y, +Z, and −Z directions are defined as front, back, right, left, upper, and lower, respectively.

The LED cover 101 is attached in a front surface upper portion of a unit main body 102 of a programmable logic controller. The LED cover 101 is molded by using a semi-transparent resin material as a raw material and covers a LED board 105 to transmit LED light emitted from LED chips 106a, 106b, 106c, . . . mounted on the LED board 105. The LED cover 101 has a shape similar to a flat hexahedral box as a whole, and two surfaces thereof are opened surfaces. One of the opened surfaces is a back surface, and the other of the opened surfaces is a lower surface. Namely, the LED cover 101 has a structure including a front surface portion 111, an upper surface portion 112, a left side surface portion 113, and a right side surface portion 114 and including no portions corresponding to a back surface portion and a lower surface portion. A back surface of the LED cover 101 is one of a pair of main surfaces (a pair of large-area surfaces), and a lower surface is a surface interposed between the main surfaces.

On a front surface 111a of the front surface portion 111 of the LED cover 101, 17 types of characters 103 (103a, 103b, 103c, . . . ) of "RUN", "0 to 8", and "A to F" are printed.

As illustrated in FIG. 8, in the case where an LED display unit 223 where the LED cover 101 having no rib is installed is viewed from a slanted front side, the LED light emitted from the LED chip 106a corresponding to the character 103a transmits the portion adjacent to an adjacent character 103b to reach the eye 90 of the user. Therefore, there is a fear that the LED light emitted from the LED chip 106a corresponding to the character 103a might be visually recognized as the LED light emitted from the LED chip 106b corresponding to the character 103b. As illustrated in FIG. 9, in the case where the LED display unit 223 where the LED cover 101 having no rib is installed is viewed from a slanted upper side, the LED light emitted from the LED chip 106a transmits the character 103a to reach the eye 90 of the user, so that there is a possibility that the LED light is viewed to overlap with the character 103a and, thus, the visibility is deteriorated.

Next, a method of position alignment between the LED cover 1 and the LED board 5 will be described. As illustrated in FIG. 2B, an upper board supporting wall 31 and a lower board supporting wall 32 are disposed so as to face each other in upper and lower portions on the back surface 11b of the front surface portion 11 of the LED cover 1. A pair of LED board positioning ribs 10 projecting toward the lower board supporting wall 32 are provided on the upper board supporting wall 31. A pair of LED board positioning ribs 10 projecting toward the upper board supporting wall 31 are provided on the lower board supporting wall 32. A lateral positioning rib 9 as a positioning projection portion is provided at the center of the upper board supporting wall 31.

Figure 10:
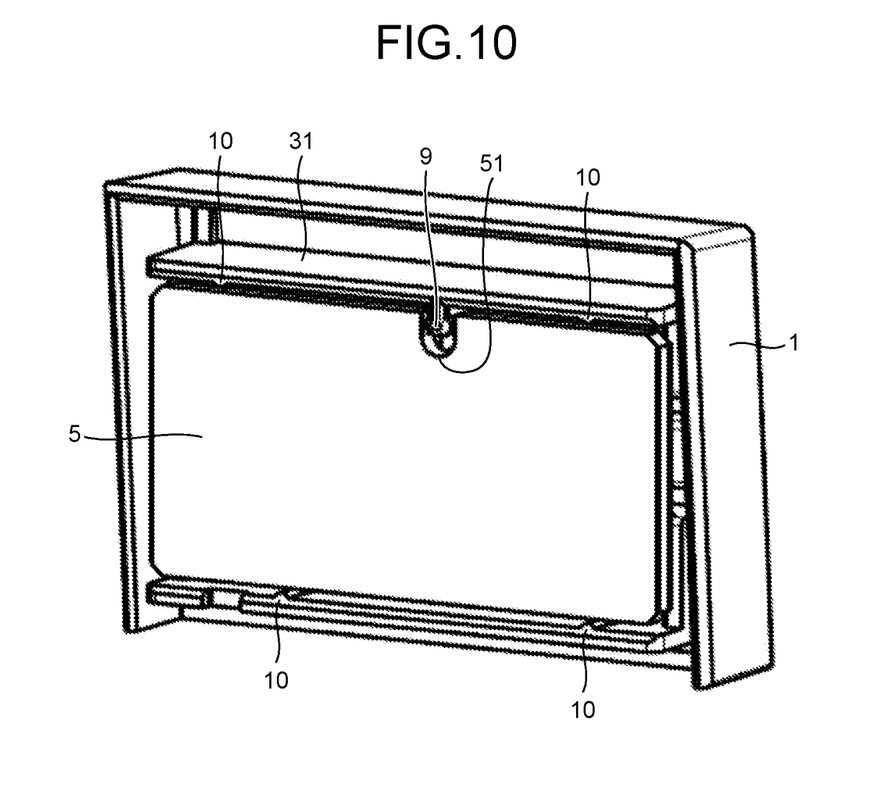
FIG. 10 is a diagram illustrating a state where the LED cover is attached to the LED board.

FIG. 10 is a diagram illustrating a state where the LED cover is attached to the LED board. Actually, the LED cover 1 is attached to the LED board 5 by covering the LED board 5 which is mounted on the unit main body 120 with the LED cover 1. However, for the better understanding of the structure, in FIG. 10, the unit main body 120 is omitted, and only the LED board 5 is illustrated. The LED board 5 has a positioning notch 51 created at the upper center thereof, and the lateral positioning rib 9 is fitted to the positioning notch 51, so that lateral movement is restricted and lateral positioning is achieved. The LED board 5 is installed between the LED board positioning rib 10 provided on the upper board supporting wall 31 and the LED board positioning rib 10 provided on the lower board supporting wall 32, so that vertical movement is restricted.

Since the positioning notch 51 is created in the LED board 5 and the positioning notch is fitted to the lateral positioning rib 9, reduction of a width of the board caused by providing a lateral positioning structure is prevented, and reduction of a mountable area is prevented. More specifically, if ribs are provided in the left side surface portion 13, the right side surface portion 14, or the like to face each other in the outer edge of the LED board 5 and the lateral positioning is performed, the width of the LED board 5 needs to be reduced by the height of the ribs. In contrast, since the positioning notch 51 is created in the LED board 5, no rib needs to be installed in the left side surface portion 13, and the right side surface portion 14, so that a decrease in mountable area caused by the reduction of the width of the LED board 5 can be prevented.

The clearance of the engagement portion between the LED board 5 and the LED cover 1 is configured to be equal to or less than the thickness of the rib 4, so that, even though the LED board 5 is moved within a range of the clearance, the LED light emitted from the LED chip 6 can be guided to the bottom surfaces 7 of the light guide holes 21.

Figure 11A:
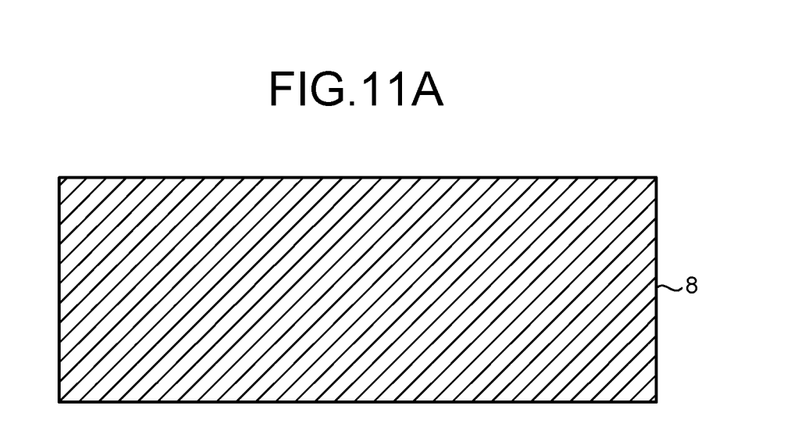
FIG. 11A is a diagram illustrating a display state of LED light transmitting the LED cover.
Figure 11B:
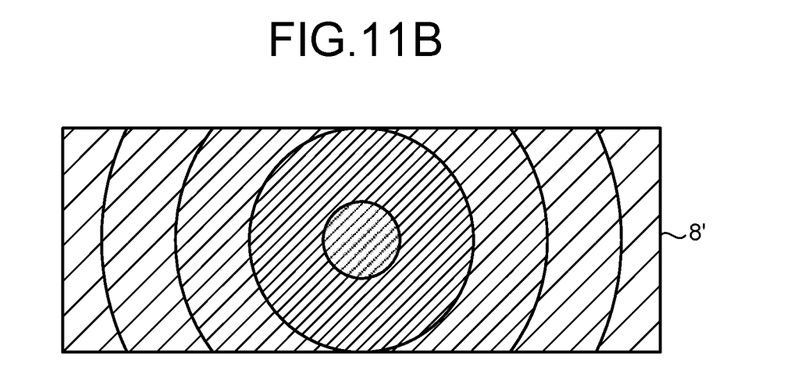
FIG. 11B is a diagram illustrating a display state of LED light transmitting an LED cover where bottom surfaces of light guide holes are not satin finished.

Next, effects of the satin finish process performed on the bottom surfaces 7 of the light guide holes 21 will be described with reference to FIG. 11A and FIG. 11B. FIG. 11A is a diagram illustrating a display state of the LED light transmitting the LED cover. Since the bottom surfaces 7 of the light guide holes 21 are satin finished, brightness of the LED light transmitting the bottom surfaces 7 of the light guide holes 21 in the light guide portions 8 becomes uniform over the entire light guide portions 8 due to the diffusion of the light by fine unevenness according to the satin finish, so that the visibility is improved.

For the comparison, the case where the bottom surfaces 7 of the light guide holes 21 are not satin finished is considered. FIG. 11B is a diagram illustrating a display state of LED light transmitting an LED cover where the bottom surfaces of light guide holes are not satin finished. In FIG. 11B, narrower hatching intervals denotes higher brightness. In the case of the LED cover 1' where the bottom surfaces 7 of the light guide holes 21 are not satin finished, since the LED light is not sufficiently diffused when transmitting the LED cover 1', the brightness of the portion the center of the optical axis of the LED light passes is high, and the brightness is decreased as it is farther away from the center of the optical axis. Namely, since the brightness is high partially only in the vicinity of the center of the optical axis, the visibility of the light guide portions 8' is lowered.

As described above, in the embodiment, the grid-shaped ribs 4 are formed on the back surface 11b of the front surface portion 11 of the LED cover 1 and the light guide holes 21 are formed so as to correspond to each of the LED chips 6. The transmission of the LED light incident in the light guide holes 21 to the outside, other than from the bottom surfaces 7, of the light guide holes 21 is prevented by the ribs 4, so that there is no fear that the LED light emitted from the LED chip 6 corresponding to a character 3 is visually recognized as the LED light emitted from the LED chip 6 corresponding to a character adjacent to the character 3 or in the LED light appears to be displayed to overlap with the character 3. Therefore, the mounting density of the LED chips 6 is increased, and thus, the width of the LED board 5 is reduced, so that miniaturization of the LED display unit 123 can be achieved. Since the LED display unit 123 is miniaturized, in the programmable logic controller 2, the miniaturization of the unit main body 120 can be achieved, so that reduction in weight exceeding an increase caused by forming the ribs 4 in the LED cover 1 can be realized.

Since the bottom surfaces 7 of the light guide holes 21 are satin finished, the brightness of the LED light transmitting the bottom surfaces 7 of the light guide holes 21 in the light guide portions 8 becomes uniform, so that the visibility is improved. Since the opening area of the light guide holes 21 is decreased as it is closer to the bottom surfaces 7, the light incident in the light guide holes 21 is condensed on the bottom surfaces 7, so that the light amount of the LED light emitted from the light guide portions 8 is larger than that of the case where the ribs 4 are not formed. Therefore, the contrast between the light guide portions 8 and the portions other than the light guide portions 8 is increased, so that the visibility is improved.

Since the ribs 4 preventing the LED light incident in the light guide holes 21 from transmitting to the outside, other than from the bottom surfaces 7, of the light guide holes 21 are integral parts of the LED cover 1, an assembly work for the LED cover 1 is not required after extraction from a mold. Therefore, an increase in number of processes at the time of manufacturing the LED cover 1 is suppressed, and thus, an increase in production cost can be suppressed.

In the above-described embodiment, although it is described that the ribs 4 have a thickness enough to prevent the LED light incident in the light guide holes 21 from transmitting to the outside, other than from the bottom surfaces 7, of the light guide holes 21, the LED light may be blocked in the side surfaces of the ribs 4 by using a nontransparent material. In this case, the LED cover 1 where only the side surfaces of the ribs 4 are nontransparent may be formed as a single component by performing two-color molding on the LED cover 1.

In the above-described embodiment, although it is described that the light guide portions 8 (bottom surfaces 7 of the light guide holes 21) have a rectangular shape, the shape of the light guide portions 8 is not limited to a specific shape. Namely, the bottom surfaces 7 of the light guide holes 21 may have a shape different from the outer shape of the LED chips 6, and thus, the light guide portions 8 having a shape different from the outer shape of the LED chips 6 may be provided. All the light guide portions 8 do not necessarily have to be the same shape, but the light guide portions 8 having different shapes may coexist.

In the above-described embodiment, the case of the LEDs (LED chips 6) as the light emitting elements is exemplified, but the light emitting element is not limited to the LED, and other light emitting elements may be employed.

INDUSTRIAL APPLICABILITY

As described above, the display device according to the present invention is useful in terms that the mounting density of the light emitting elements is increased and, thus, the width of the light emitting element board can be reduced, and particularly, the display device is appropriately applied, as an LED display unit, for a programmable logic controller of which width-direction dimensions are greatly restricted.

REFERENCE SIGNS LIST

1 LED cover, 2 programmable logic controller, 3, 3a, 3b characters, 4 ribs, 5 LED board, 6, 6a, 6b LED chips, 7, 7a, 7b bottom surfaces, 8, 8a, 8b light guide portions, 9 lateral positioning rib, 10 LED board positioning ribs, 11 front surface portion, 11a front surface, 11b back surface, 12 upper surface portion, 13 left side surface portion, 14 right side surface portion, 21, 21a, 21b light guide holes, 22 grooves, 31 upper board supporting wall, 32 lower board supporting wall, 90 eye of user, 51 positioning notch, 120 unit main body, 121 case, 122 face plate, 123 LED display unit.

The invention claimed is:

1. A display device comprising:
a light emitting element board on which a plurality of light emitting elements arranged in a matrix shape are mounted; and
a cover that covers a surface of the light emitting element board where the light emitting elements are mounted, the display device being applied, as a display unit displaying a state of operation, for an electronic device, wherein the cover includes:
a light transmitting plate where a back surface thereof is arranged to face the light emitting elements and a grid-shaped light transmission preventing wall projected to form a plurality of recessed light guide holes at locations corresponding to the light emitting elements are formed on the back surface thereof;
a plurality of ribs formed in the grid-shape of the light transmission preventing wall; and
a print layer where characters are printed adjacent to each of locations corresponding to bottom surfaces of the light guide holes on a front surface of the light transmitting plate, and
each of the light guide holes is a tapered hole of which opening area is decreased toward the bottom surfaces, and the bottom surfaces are satin finished, wherein:
the light transmitting plate and the grid-shaped light transmission preventing wall are integral parts of the cover such that the cover is a single-piece component, and
at least one groove is disposed between the plurality of ribs.

2. The display device according to claim 1, wherein width direction positioning of the cover is performed by fitting a notch formed in the light emitting element board to a positioning projection portion provided in the back surface of the light transmitting plate.

3. The display device according to claim 1, wherein reflectance of portions constituting side walls of the light guide holes of the light transmission preventing wall is higher than that of the light transmitting plate.

4. The display device according to claim 1, wherein the bottom surfaces of the light guide holes have shapes different from respective outer shapes of the light emitting elements.

5. The display device according to claim 1, wherein the grid-shaped light transmission preventing wall is molded integrally with a front surface portion of the cover which functions as the light transmitting plate.

6. The display device according to claim 1, wherein the plurality of light emitting elements are arranged outside of the light guide holes.

7. A display device comprising:
a light emitting element board on which a plurality of light emitting elements arranged in a matrix shape are mounted; and
a cover that covers a surface of the light emitting element board where the light emitting elements are mounted, the display device being applied, as a display unit displaying a state of operation, for an electronic device, wherein the cover includes:
a light transmitting plate where a back surface thereof is arranged to face the light emitting elements and a grid-shaped light transmission preventing wall projected to form a plurality of recessed light guide holes at locations corresponding to the light emitting elements are formed on the back surface thereof; and
a print layer where characters are printed adjacent to each of locations corresponding to bottom surfaces of the light guide holes on a front surface of the light transmitting plate, and
each of the light guide holes is a tapered hole of which opening area is decreased toward the bottom surfaces, and the bottom surfaces are satin finished, and wherein a plurality of ribs formed in the grid-shape of the light transmission preventing wall and at least one groove is disposed between the plurality of ribs.

8. The display device according to claim 7, wherein width direction positioning of the cover is performed by fitting a notch formed in the light emitting element board to a positioning projection portion provided in the back surface of the light transmitting plate.

9. The display device according to claim 7, wherein reflectance of portions constituting side walls of the light guide holes of the light transmission preventing wall is higher than that of the light transmitting plate.

10. The display device according to claim 7, wherein the bottom surfaces of the light guide holes have shapes different from respective outer shapes of the light emitting elements.

11. The display device according to claim 7, wherein the light transmitting plate and the grid-shaped light transmission preventing wall are integral parts of the cover such that the cover is a single-piece component.

12. The display device according to claim 7, wherein the plurality of light emitting elements are arranged outside of the light guide holes.

13. A display device comprising:
a light emitting element board on which a plurality of light emitting elements arranged in a matrix shape are mounted; and
a cover that covers a surface of the light emitting element board where the light emitting elements are mounted, the display device being applied, as a display unit displaying a state of operation, for an electronic device, wherein the cover includes:
a light transmitting plate where a back surface thereof is arranged to face the light emitting elements and a grid-shaped light transmission preventing wall projected to form a plurality of recessed light guide holes at locations corresponding to the light emitting elements are formed on the back surface thereof; and
a print layer where characters are printed adjacent to each of locations corresponding to bottom surfaces of the light guide holes on a front surface of the light transmitting plate, and
each of the light guide holes is a tapered hole of which opening area is decreased toward the bottom surfaces, and the bottom surfaces are satin finished, wherein
the plurality of light emitting elements are arranged outside of the light guide holes.

14. The display device according to claim 13, wherein width direction positioning of the cover is performed by fitting a notch formed in the light emitting element board to a positioning projection portion provided in the back surface of the light transmitting plate.

15. The display device according to claim 13, wherein reflectance of portions constituting side walls of the light guide holes of the light transmission preventing wall is higher than that of the light transmitting plate.

16. The display device according to claim 13, wherein the bottom surfaces of the light guide holes have shapes different from respective outer shapes of the light emitting elements.

17. The display device according to claim 13, wherein the light transmitting plate and the grid-shaped light transmission preventing wall are integral parts of the cover such that the cover is a single-piece component.

18. The display device according to claim 13, wherein a plurality of ribs formed in the grid-shape of the light transmission preventing wall and at least one groove is disposed between the plurality of ribs.

* * * * *